United States Patent
Godwin

(10) Patent No.: US 8,019,003 B2
(45) Date of Patent: Sep. 13, 2011

(54) SYSTEMS AND METHODS FOR TRACKING SCREEN UPDATES

(75) Inventor: Mark Godwin, Middlesex (GB)

(73) Assignee: Computer Associates Think, Inc., Islandia, NY (US)

( * ) Notice: Subject to any disclaimer, the term of this patent is extended or adjusted under 35 U.S.C. 154(b) by 1593 days.

(21) Appl. No.: 11/132,639

(22) Filed: May 19, 2005

(65) Prior Publication Data

US 2006/0031854 A1    Feb. 9, 2006

Related U.S. Application Data

(60) Provisional application No. 60/573,142, filed on May 21, 2004.

(51) Int. Cl.
*H04N 7/12* (2006.01)
*H04B 1/66* (2006.01)

(52) U.S. Cl. .................. 375/240.26; 375/240

(58) Field of Classification Search .......... 348/148, 348/135; 382/254, 309, 276; 375/240.26, 375/240.24, 240.15, 240.1, 240.01
See application file for complete search history.

(56) References Cited

U.S. PATENT DOCUMENTS

| | | | | |
|---|---|---|---|---|
| 5,134,697 A | * | 7/1992 | Scheffler | 711/171 |
| 5,363,483 A | * | 11/1994 | Jones et al. | 715/766 |
| 5,913,920 A | | 6/1999 | Adams et al. | 709/204 |
| 7,130,888 B1 | * | 10/2006 | Hickman et al. | 709/208 |
| 7,222,305 B2 | * | 5/2007 | Teplov et al. | 715/751 |
| 2002/0159517 A1 | | 10/2002 | Okamoto et al. | 375/240.01 |
| 2003/0031198 A1 | * | 2/2003 | Currivan et al. | 370/465 |
| 2003/0076414 A1 | * | 4/2003 | Sato et al. | 348/148 |
| 2004/0076018 A1 | * | 4/2004 | Okamoto | 362/559 |

FOREIGN PATENT DOCUMENTS

EP    0 590 817 A1    4/1994

OTHER PUBLICATIONS

Notification of Transmittal of the International Search Report and the Written Opinion of the International Searching Authority for International Application No. PCT/US2005/017791, filed May 19, 2005, (7 pages).
Communication pursuant to Article 94(3) EPC, Application No. 05 754 248.2-2205, Ref. No. HCD/J00049339EP, (5 pages), Aug. 13, 2009.

* cited by examiner

*Primary Examiner* — Behrooz Senfi
(74) *Attorney, Agent, or Firm* — Baker Botts L.L.P.

(57) ABSTRACT

A method of capturing a screen includes monitoring screen changes on a first display system and inserting information into a queue, the information including a first type of information and a second type of information, reading the information from the queue and maintaining a dirty region describing areas of the screen which have been changed, wherein areas affected by the first type of information are added to the dirty region and areas affected by the second type of information are subtracted from the dirty region.

24 Claims, 12 Drawing Sheets

SYSTEMS AND METHODS FOR TRACKING SCREEN UPDATES

REFERENCE TO RELATED APPLICATION

The present disclosure is based on and claims the benefit of Provisional application Ser. No. 60/573,142 filed May 21, 2004, the entire contents of which are herein incorporated by reference.

BACKGROUND OF THE DISCLOSURE

1. Field of the Disclosure

The present disclosure relates generally to screen updates and in particular, to systems and methods for tracking screen updates.

2. Description of the Related Art

The enterprise IT environment has become more geographically dispersed and the number of remote users of such resources has increased. The need for remotely managing and supporting these resources has become more and more important. Remote management can include accessing remote services such as network applications, transferring files among servers and workstations, administering servers, viewing or taking control of distributed desktops to help users with problems, etc.

Remote control as used herein refers to viewing, transferring and running files on a remote personal computer (PC) as well as systems designed specifically for enterprise management, offering centralized systems, policy, user/group, and access control management and providing session information and other administrative features, etc.

Remote control of resources allows single point administration of multiple servers, management of remote servers (e.g., Windows NT servers), etc. In addition, help desk personnel can be in a better position to address and resolve issues by viewing and controlling a remote user's machine. These are just a few of the benefits of remote control of system resources.

A screen capture subsystem of a remote control/screen recording system includes remote control/screening recording software (RC Software). A screen capture subsystem is responsible for serializing screen changes on one computer (the Host) into a data-stream, for later decoding and re-display by a rendering subsystem (the Viewer). There are two main techniques used when implementing screen capture.

Remote Control (RC) applications reproduce the view of a computer's screen (the Host), on a second computer (the Viewer). The Viewer computer can control the Host computer using an input device such as keyboard, mouse, etc., as if the viewer were physically present to operate the host computer.

Screen Capture (SC) applications record screen activity into a file, which can later be played back, usually through a special player application. Remote control applications usually include a recording system for recording screen activity. Accordingly, screen capture applications provide a sub-set of RC application features.

The present disclosure relates to functions common to both RC and SC applications. Accordingly, as used herein, the term RC may be used to refer to both RC and SC systems. Unless otherwise specified, the term Viewer, as used herein, may be used to refer to both Viewer and Replayer components.

A Video Data Capture (VDC) system is a key component of RC. The VDC system is responsible for capturing the changing Host screen image into a serialized data stream, so that it can be reproduced on the Viewer. The VDC system has several end-user requirements. For example, the Viewer should accurately depict the view of the Host screen, with no artifacts. In addition, the serialized data stream should be small enough to be sent in real-time over slow networks. For example, the data bandwidth should scale to the available network bandwidth, to give better performance over fast networks, while still retaining usability at very restricted bandwidths. The Viewer should also reflect an up-to-date image of the Host screen at all times, with as little latency as possible. The Host machine should also be able to function normally when it is being viewed. Therefore, the VDC system should not consume a large proportion of the Host's CPU and memory resources.

The VDC system also has several architectural requirements. For example, any low-level OS dependent video capture components should be kept as simple as possible to ensure robustness, as program errors in low-level components can be catastrophic to the system. Therefore, heavy processing of captured video data should be performed in a detached user-mode process. In addition, the data stream from the VDC component should be platform independent, simplifying porting of the Viewer components to new platforms. The VDC component should also be as platform-independent as possible. Accordingly, the host-side processing of the low-level captured data should be platform independent.

There are several approaches to implementing a VDC system. These include relatively simple approaches to relatively complicated approaches. Examples of these approaches include Screen Copy, Polled Delta Copy, Updated Delta Copy, and Drawing Primitive Serialization. The benefits and drawbacks of each of these approaches will be briefly described below.

In a screen copy approach, complete bitmap images of the screen are captured at close intervals, using normal operating system drawing calls, and compressed into the data stream. The Viewer can reproduce the Host's screen by drawing the captured images in turn. This is a relatively simple approach. However, this approach is not generally used in practice, since it does have substantial drawbacks. For example, the screen copy approach has huge bandwidth requirements and high latency.

In a polled screen deltas approach, a complete bitmap image of the screen is initially captured, and compressed into the data stream. This image is also stored in memory on the host machine. At close intervals, new complete images of the screen are captured. These are compared with the previous image, and the areas which have changed (known as deltas) are compressed into the data stream. The Viewer can reproduce the Host's screen by drawing the delta images in turn. However, the change comparison is CPU intensive. Accordingly, an inefficient algorithm is generally used to detect changes. Usually, the captured image is split into small tiles, (e.g. 64*64 pixels) which are compared either by memory comparison or checksum. If a tile is seen to differ, the entire tile is sent. Advantages of the polled screen approach include being able to use a relatively simple video protocol, it is relatively simple to develop & port, using normal OS calls and Data bandwidth can be easily limited to avoid falling behind, reducing the difference between typical and worst-case drawing scenarios. Disadvantages of the approach include relatively high bandwidth requirements for typical drawing operations, poor performance for screen to screen copies, high latency and high Host CPU and memory resource utilization. The polled screen deltas approach is often used in RC applications where the application is restricted to normal operating system drawing calls. An example of its use is KDE Desktop Sharing.

In an updated delta copy approach, all drawing operations on the Host machine that modify the state of the screen are monitored by the VDC component and, used to maintain a data structure representing the screen region affected by the sum of all drawing operations. This region (known as the dirty region) is read periodically from the screen as bitmap images, which are serialized into the data stream. The dirty region is then emptied, pending more drawing operations. Because there are no CPU intensive delta comparison calculations, it is possible to read the updated screen images much faster. There is also less bandwidth wastage, because the dirty screen region is a perfect representation of the delta images that need to be sent. The Viewer can reproduce the Host's screen by drawing the delta images in turn. The resulting image is effectively a snapshot of the captured screen after multiple drawing operations have taken place. Advantages of the updated delta copy approach include the use of a simple video protocol which allows development of "thin" portable Viewer applications, it is reasonably easy to develop, although low-level OS hooks may be required and data bandwidth can be easily limited to avoid falling behind, reducing the difference between typical and worst-case drawing scenarios. Disadvantages of the updated delta copy approach include high bandwidth requirements for typical drawing operations and unacceptable performance for screen to screen copies. FIG. 1A shows an implementation of the updated delta copy approach. FIG. 2A is a flow chart for describing the updated delta copy approach.

The video capture driver 12, running as part of the OS display subsystem 10, monitors all drawing operations that affect the screen (Step S2). The video capture driver 12 then inserts data packets into the processing queue 14 describing areas of the screen that have been modified by each operation (Step S4). The processing thread 16, running as part of the Host, reads packets out of the processing queue as fast as it can (Step S6). The screen area affected by each packet is used to maintain a Dirty region 18, which describes the areas of the screen which have been changed since they were last sent to the Viewer 20 (Step S8). That is, the area affected by each packet in the processing queue 14 is added to the Dirty region 18 and the packet is then discarded (Step S10). When there are no more packets remaining in the Processing queue 14, the Processing thread 16 scans through the Dirty region 18 from top to bottom, breaking the region down into small rectangles (Step S12). For each rectangle in the dirty region 18, a bitmap for the corresponding area is read directly from the screen of display system 10, through normal OS drawing calls (Step S14). The returned bitmap image undergoes normal video data processing (color reduction, etc.) and is sent, via a blocking send to the connected Viewer 20 on the network. The rectangle is then subtracted from the Dirty region (Step S18). The process then returns to Step S8. When the Dirty region 18 is empty, and there are no packets in the processing queue 14, processing is paused. This system has drawbacks such as unnecessary overdraw (e.g., the same data is sent more than once) because packets may be waiting in the processing queue 14 while the processing thread 16 is reading data from the screen.

Another approach is a drawing primitive serialization approach. All drawing operations on the Host machine that modify the state of the screen are captured by the VDC component. These operations are captured as a series of relatively primitive graphics operations, e.g. drawing shapes, image (bitmap) copies, text drawing, screen to screen transfers, etc. Complex instructions for reproducing these drawing operations are serialized into the data stream. When the drawing operations are reproduced by the Viewer component, the result is an exact replica of the captured screen. Advantages of this approach include very low bandwidth (i.e. data size) requirements for most drawing operations and excellent best-case performance. Disadvantages of this approach include decoding of captured video data requires a powerful viewer machine, the video data protocol is tied to OS architecture, hindering portability and it requires high-bandwidth in worst-case scenarios. The Viewer's representation of screen can also fall behind if the network medium does not provide sufficient bandwidth, as drawing operations cannot be easily discarded without causing corruption at the viewer. However, complex and CPU intensive algorithms can be employed to safely limit serialized data bandwidth.

An example of this approach is shown in FIG. 1B and will be described by reference to the flow chart shown in FIG. 2B. The video capture driver 13, running as part of the OS display subsystem 11, monitors all drawing operations that affect the screen (Step S20), and inserts data packets into the processing queue 15, containing instructions on how to repeat these drawing operations (Step S22). The processing thread 17, running as part of the Host process, reads packets as fast as it can from the processing queue 15 (Step S24). Each video packet goes through bitmap color reduction, font substitution, and overdraw processing (Step S25). Packets are then placed into Network queue 19, awaiting dispatch over the network (Step S26). The network dispatch thread 21 then reads packets out of the network queue, and sends them over the network (not shown), limited in speed by the network medium (Step S27). Overdraw processing, whereby previous drawing packets that are still waiting for dispatch over the network are discarded, if the screen region affected by the drawing packet would be completely redrawn by the sum of the drawing packets that follow it can be performed. This processing prevents the viewer from falling behind when the network bandwidth becomes the bottleneck in the video capture pipeline. However, a downside of this approach is that this process is CPU intensive.

The most commonly used method of video capture for advanced remote control applications is the "Drawing Primitive Serialization" approach. The main drawback of this method is that it is tied very closely to the operating system drawing architecture, both in terms of implementation and video data protocol. Porting an existing VDC system of this type to a new platform is inefficient, and requires one of two approaches to be effective. The first approach is extending the existing protocol to support each new OS graphics architecture. However, this compromises Viewer interoperability between platforms, making Viewers very hard to develop on each platform. The second approach is shoe-horning new platform implementations into the existing protocol. However, this is both time consuming, and is at the expense of reproduction accuracy at the Viewer. In addition, while porting the Host component in this way would be at best feasible, the Viewer component would be extremely hard to port to other platforms.

One of the better alternatives described above is the "Updated Delta Copy" method. However, this method performs significantly worse than some existing implementations. One of the major downfalls of this approach is that it performs very poorly for screen to screen copies and very simple drawing operations, which are used frequently in every day computing operations. For instance, to read this document you will be constantly scrolling down the page. This operation involves several screen to screen copies. The "Drawing Primitive Serialization" method handles such operations with ease, but the "Updated Screen Deltas" approach treats the entire scrolled area as an updated screen area, which needs to be serialized in bitmap form. Even with compression, this can result in several megabytes of data. Therefore, an improved system for performing screen updates is desirable.

SUMMARY

A method of capturing a screen comprising monitoring screen changes on a first display system and inserting information into a queue, the information including a first type of information and a second type of information, reading the information from the queue and maintaining a dirty region describing areas of the screen which have been changed, wherein areas affected by the first type of information are added to the dirty region and areas affected by the second type of information are subtracted from the dirty region.

A system for capturing a screen comprising a monitoring unit for monitoring screen changes on a first display system and inserting information into a queue, the information including a first type of information and a second type of information, a reading unit for reading the information from the queue and a maintaining unit for maintaining a dirty region describing areas of the screen which have been changed, wherein areas affected by the first type of information are added to the dirty region and areas affected by the second type of information are subtracted from the dirty region.

A computer recording medium including computer executable code for capturing a screen, comprising code for monitoring screen changes on a first display system and inserting information into a queue, the information including a first type of information and a second type of information, code for reading the information from the queue and code for maintaining a dirty region describing areas of the screen which have been changed, wherein areas affected by the first type of information are added to the dirty region and areas affected by the second type of information are subtracted from the dirty region.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1A:
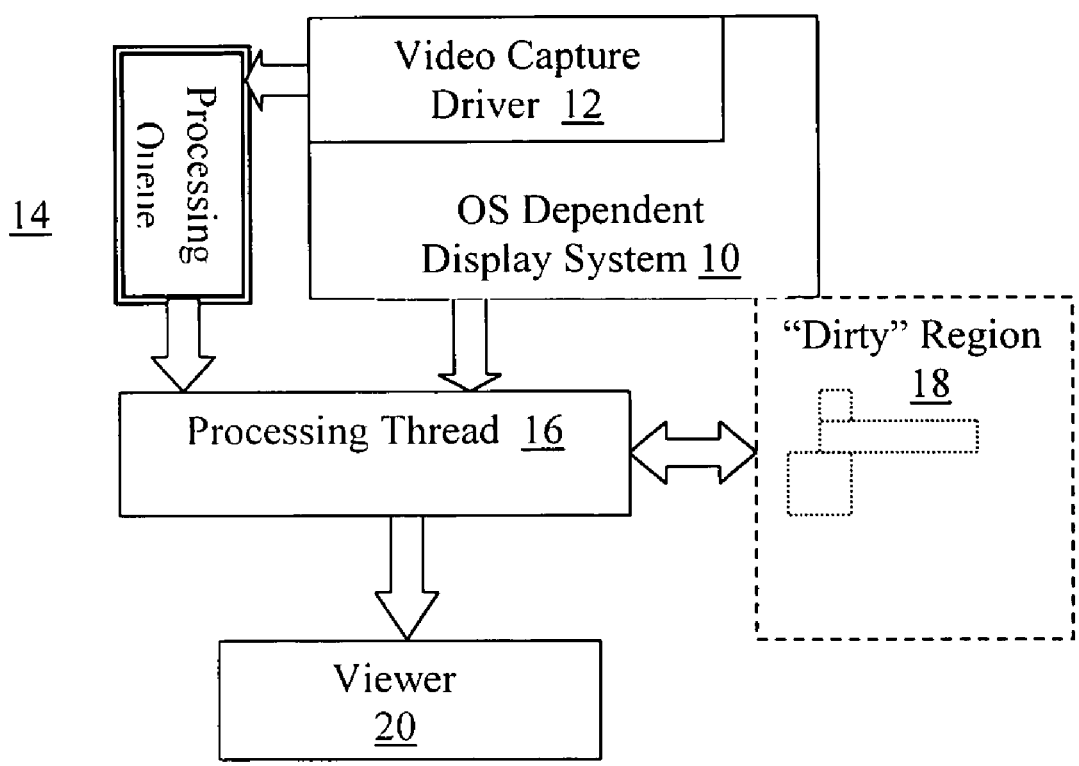
FIG. 1A is a block diagram for describing an updated delta copy approach for updating a viewer display.
Figure 1B:
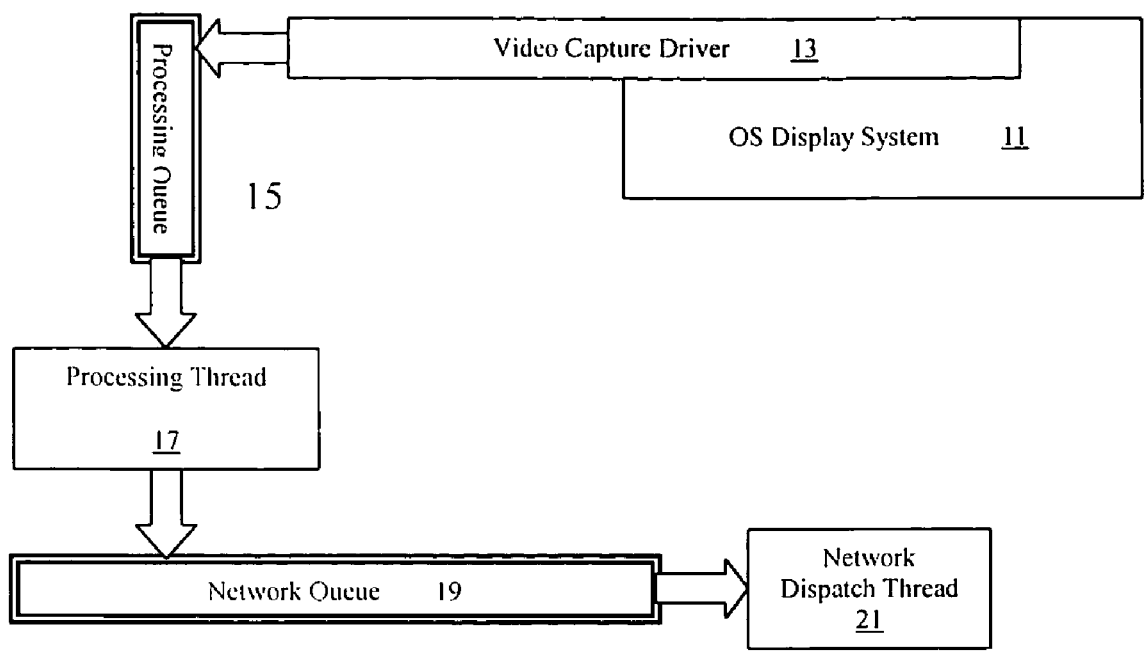
FIG. 1B is a block diagram for describing a drawing primitive serialization approach for updating a viewer display.
Figure 2A:
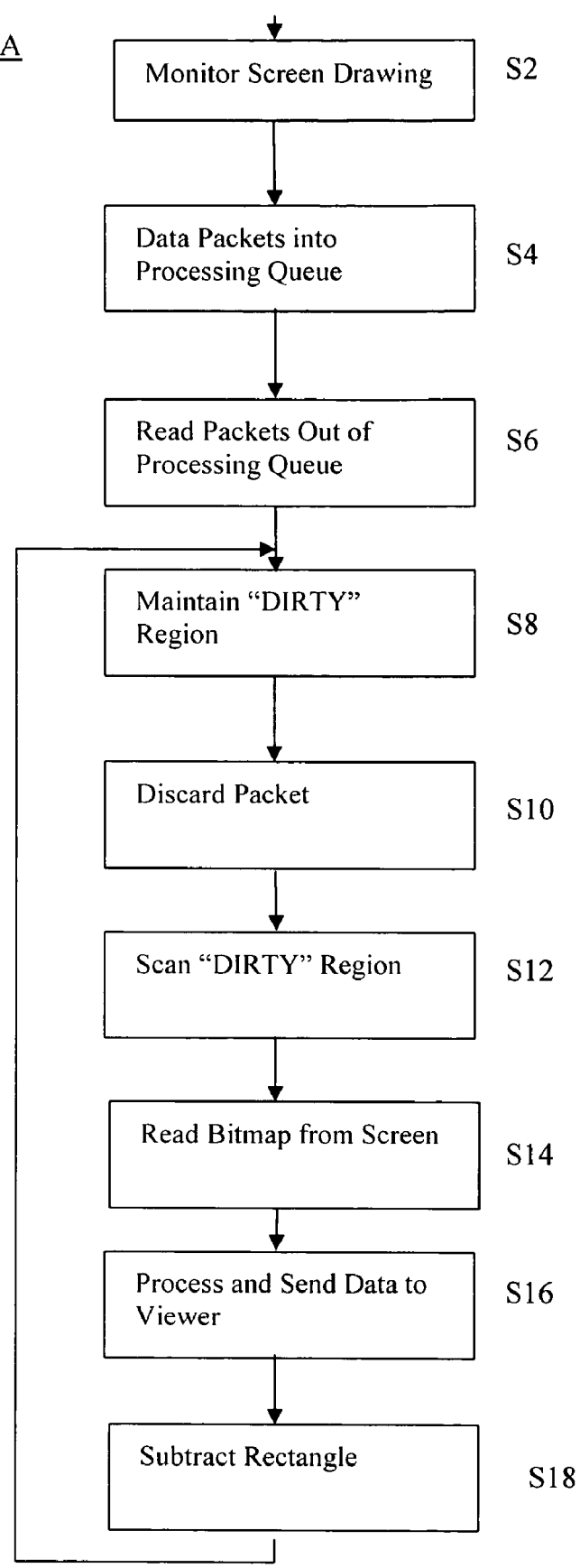
FIG. 2A is a flow chart for further describing the approach depicted in FIG. 1A.
Figure 2B:
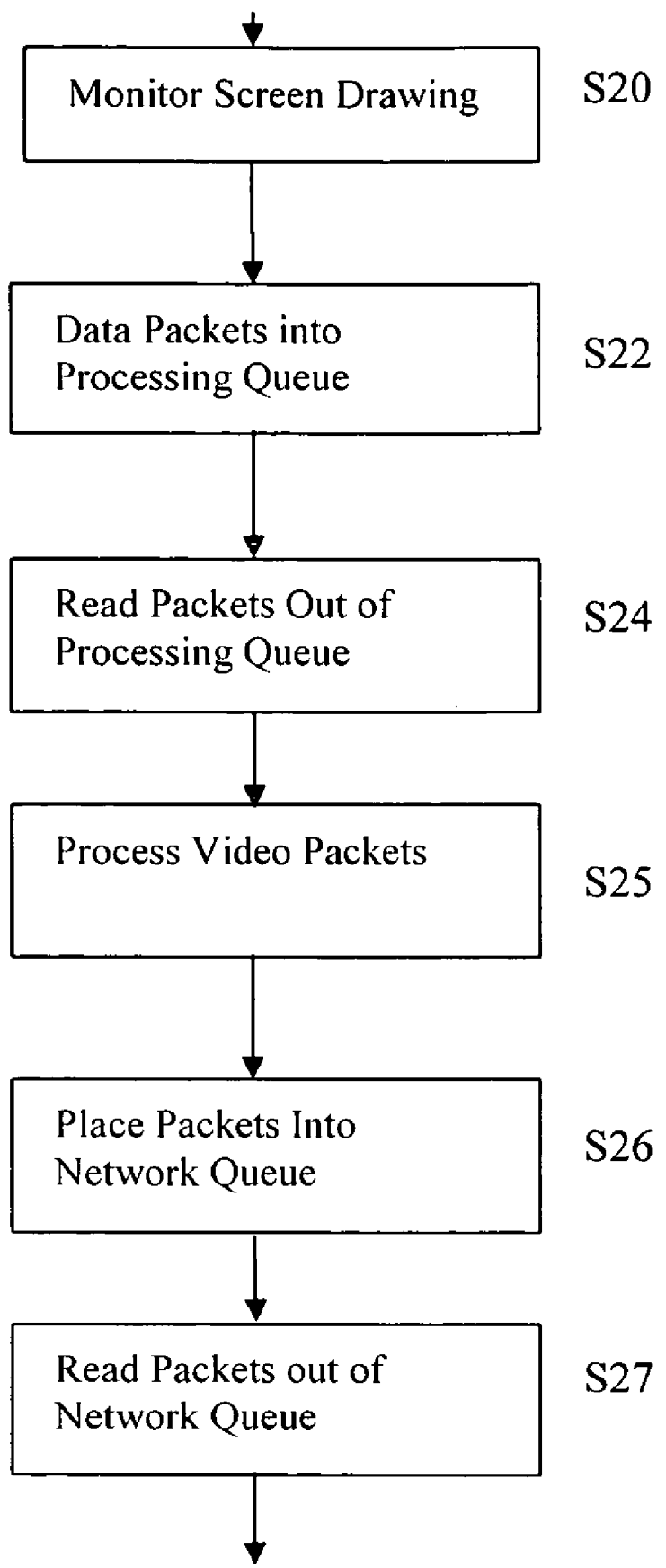
FIG. 2B is a flow chart for further describing the approach depicted in FIG. 1B.

The present disclosure provides tools in the form of methodologies, apparatuses and systems. The tools may be embodied in one or more computer programs stored on a computer readable medium or program storage device and/or transmitted via a computer network or other transmission medium.

In describing preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

Embodiments of the present disclosure describe hybrids of the "Drawing Primitive Serialization" and "Updated Delta Copy" approaches. This approach extends the Updated Delta Copy system to allow certain simple drawing operations, including screen to screen copies, to be included in the captured data. The remaining screen updates are used to maintain a dirty region, as with the original "Updated Delta Copy" system. The embodiments of the present disclosure mitigate major disadvantages of both of the individual methods they are based on. For example, the high bandwidth requirement for typical drawing operations is improved because simple drawing operations are serialized as tiny drawing commands, rather than images the unacceptable performance for screen to screen copies is remedied with the inclusion of screen to screen drawing command support and decoding of captured video data does not require a powerful viewer machine, because of the simplification in video data protocol, and the ease of bandwidth limitation. In addition, video data protocol is no longer tied to OS architecture, as the simple drawing commands supported are universal and the bandwidth requirements in worst-case scenarios are reasonable, and the data bandwidth can be easily limited Screen-to-screening drawing operations cannot simply be interspersed with screen updates. The reason for this is that the Viewer's screen representation could become corrupted, since it is possible for screen updates to be missed. This is because screen-to-screen copy operations modify the previous dirty region. Accordingly, the embodiments of the present disclosure enforce synchronization of screen update processing to avoid screen corruption.

Figure 3:
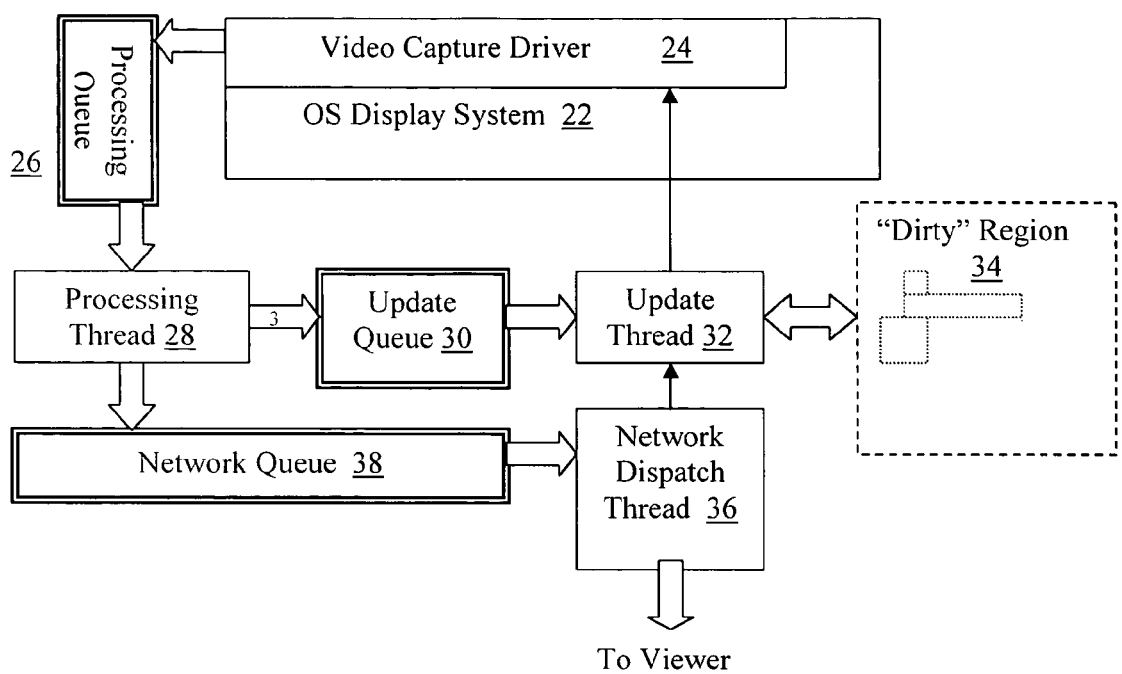
FIG. 3 is a block diagram for describing a hybrid approach for updating a viewer display according to an embodiment of the present disclosure.
Figure 4:
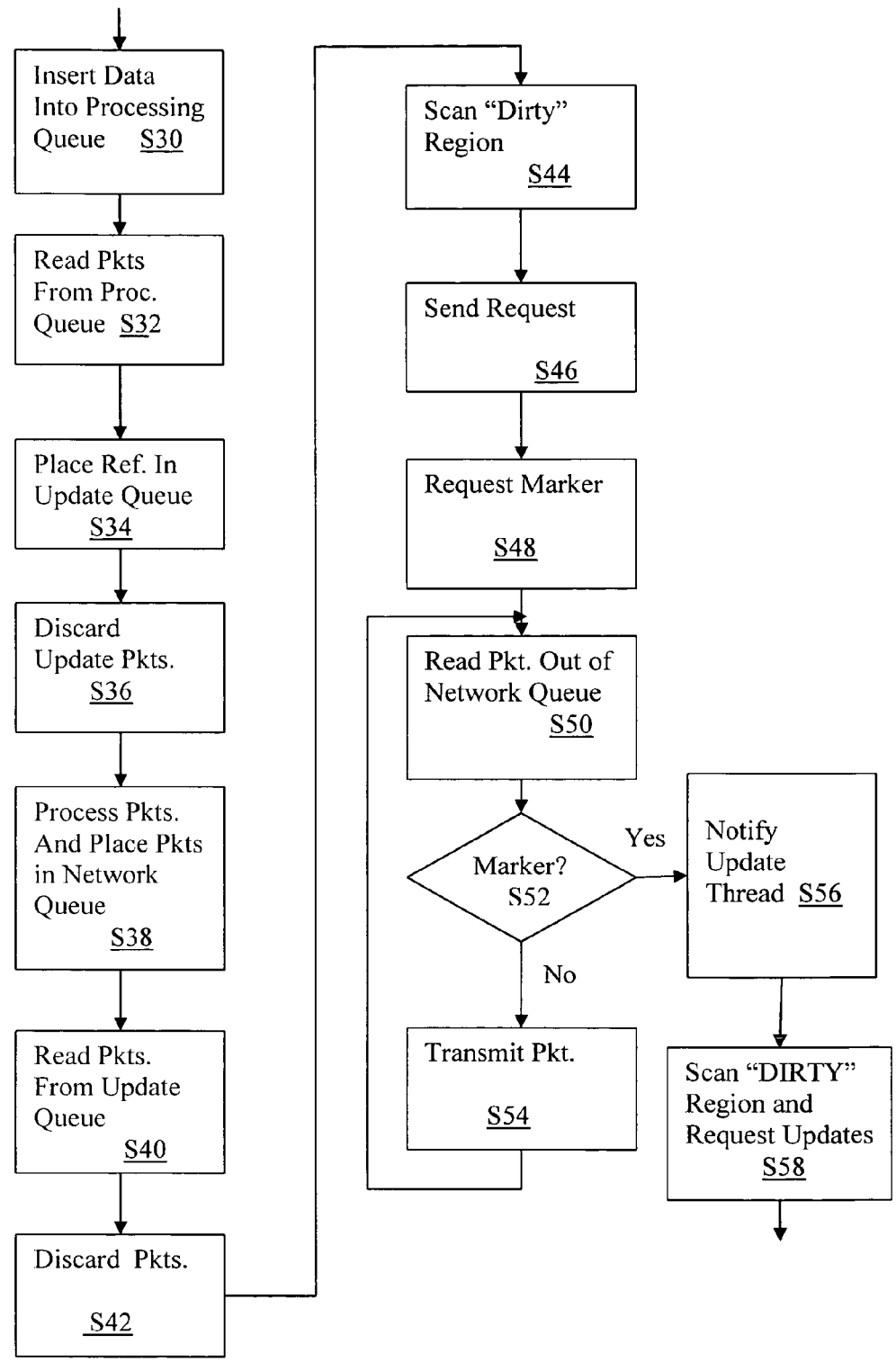
FIG. 4 is a flow chart for describing the hybrid approach for updating a viewer display according to an embodiment of the present disclosure.

An embodiment of the present disclosure will be described by reference to FIGS. 3 and 4. FIG. 3 shows a block diagram for describing the flow of data. The system shown in FIG. 3 includes OS display system 22, video capture driver 24, processing queue 26, processing thread 28, update queue 30, update thread 34, network queue 38 and network dispatch thread 36.

Video capture driver 24 inserts serialized data packets into the processing queue 26 (Step S30). That is, screen drawing on OS display system 22 is serialized into various types of packets. For example, packets can include packets describing areas of the screen that have been modified (Dirty packets), simple drawing primitives (e.g. solid rectangle fills) (Obliterating packets), Screen to screen copy operations (Copy packets) and other miscellaneous packets (e.g. mouse cursor messages, etc.) In addition, the video capture driver 24 inserts Bitmap packets describing screen areas into the processing queue 26, requested by the Update thread 32 as will be explained later below (these are also classified as Obliterating packets). The Processing thread 28 then reads packets out of the processing queue 26 as fast as it can (Step S32). Processing thread 28 places a reference to all Dirty, Obliterating and Copy packets in the Update queue 30 (Step S34). Dirty packets are then discarded by the Processing thread (Step S36). The remaining packets undergo normal video data processing (color reduction, etc.) and are placed in the Network queue 38 (Step S38), awaiting dispatch. Update thread 32 reads packets of the Update queue as fast as it can, and processes each packet (Step S40). The screen area affected by each packet is used to maintain a Dirty region, which describes the areas of the screen which have been changed since they were last sent to the Viewer. Areas of the Dirty region affected by Dirty packets add to the Dirty region, while those areas of the Dirty region affected by Obliterating packets subtract from the Dirty region. Copy packets are processed with a multiple-step region algorithm to update the dirty region correctly. Once each packet is processed, the reference to the packet is discarded (Step S42). When there are no more packets remaining in the Update queue 30, the Update thread 32 scans through the Dirty region, if non-empty, from top to bottom, breaking the region down into small rectangles (Step S44). This scanning can be interrupted by new packets arriving in the Update queue 30. For each rectangle in the Dirty region 34, a request for a Bitmap packet for the corresponding area of the screen is sent to the Video Capture driver 24 (Step S46). This request can take the form of a drawing operation, so that it is interlocked with all other drawing operations on the system (Only 1 thread can draw at any time). The Bitmap data is not returned directly to the Update thread 32, but is placed in the processing queue 26. When the processing reaches the bottom of the Dirty region 34, or after a sufficient amount of data has been requested, the Update thread 32 requests a special Marker packet from the Video capture driver 24 (Step S48). The Update thread 32 then stops the scanning of the Dirty region 34, until it receives a Marker packet through the Update queue 30. This prevents the update thread 32 from requesting information faster than it can be processed, and from re-requesting the same area of the screen. The Network Dispatch thread 36 reads packets out of the Network queue 38 (Step S50), and transmits them over the network to a connected Viewer system (Step S54). The speed of this data transmission is limited by the network bandwidth. When the Dispatch thread 36 retrieves a Marker packet from the network queue 38 (Yes, Step S52), it does not send the packet to the Viewer over the network. Instead, Dispatch thread 36 notifies the Update thread 32 by inserting the Marker packet into the Update queue 30 (Step S56). The Update thread 32 will then begin scanning the Dirty region 34 and requesting updates again, if the Dirty region 34 is not empty (Step S58).

It is possible to combine the Processing and Update threads into a single thread. This would remove the need for the Update queue 30 and would reduce processing overhead. However, this removes the ability to lower the priority of the Update processing, to allow quicker pass through of ordinary drawing (e.g., Obliterating) packets, which could be used to reduce latency.

The following is a more detailed description of various components of embodiments of the present disclosure.

Figure 5:
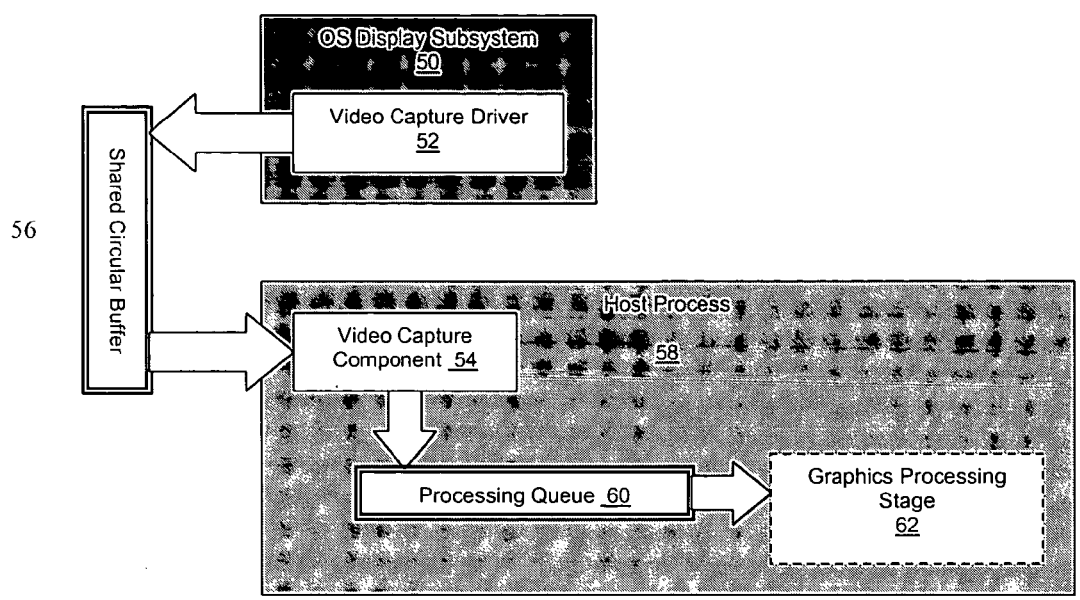
FIG. 5 is a block diagram for describing video data capture in more detail.
Figure 6:
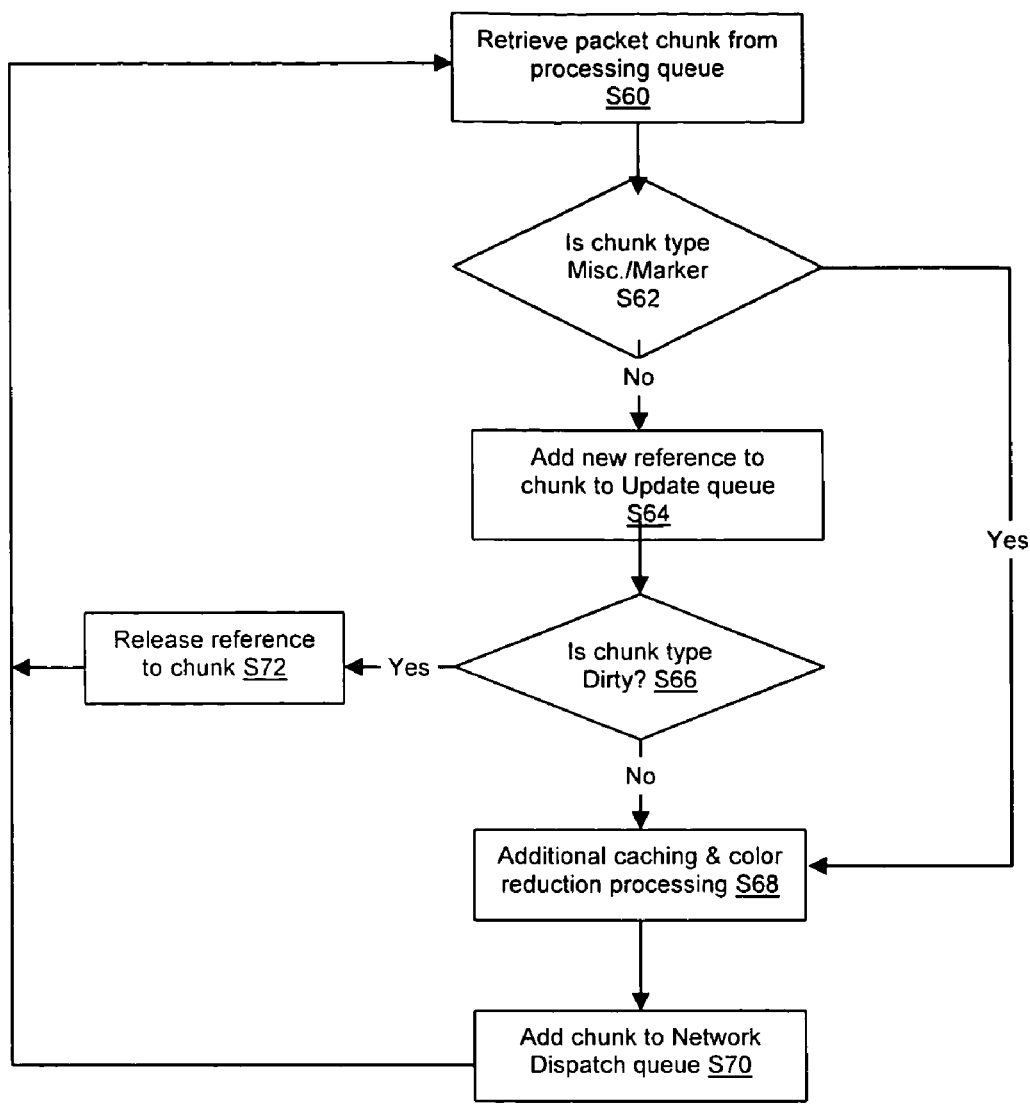
FIG. 6 is a flow chart for describing the processing thread according to an embodiment of the present disclosure.

As shown in FIG. 5, video data capture is performed in a low-level Operating System display subsystem 50. This may be a privileged OS component. Accordingly, the data undergoes very little manipulation at this stage, to reduce complexity. The Video Capture driver 52 passes captured data as video packets to a video capture component in the Host process 58. According to an embodiment of the present disclosure, a shared circular buffer 56 of video packets is stored in shared memory, mapped between both the OS display subsystem 50 and the Host process 58. The host process 58 reads the video packets out of circular buffer 56, and into an unlimited Processing queue 60. When the Video Capture Driver 52 is capturing video data, it can generate data very quickly. Accordingly, if the limited circular buffer 56 fills up, video data will be lost. This is a situation that is unacceptable in most situations. Accordingly, a dedicated video capture thread is used to retrieve the video data from the circular buffer 56. Shared synchronization objects are used to enforce thread-safe access to the circular buffer 56. Of course, the technique for retrieving captured data from the Video Capture Driver 52 is not limited to embodiments described herein. For example, other techniques, such as FIFO pipes, or internal network connections could be used. According to embodiments of the present disclosure, the Host process 58 and OS display subsystem 50 are separate entities. For example, none of the processing in the Graphics processing stage takes place in the OS display subsystem 50. Video capture driver 52 breaks down complex drawing commands into a sequence of simpler commands and outputs one or more video packets for each drawing operation that it intercepts.

Screen drawing can be serialized into several packet types, including Obliterating packets (simple drawing operations), Copy packets (screen to screen copy operations), Dirty packets (packets indicating an area of the screen which has been updated by a drawing operation), Marker packets (Special markers, requested by the graphics processing component) and Miscellaneous packets (Mouse pointer and screen dimension information.) Each type of packet will be described in more detail below.

Obliterating packets contain instructions for reproducing simple drawing operations, such as solid rectangle fills and image copies. Each Obliterating packet also contains a Target region, which describes the exact area of the screen that is affected by this operation. To reduce complexity, the target region can be limited to a single rectangle, or a number of rectangles. Obliterating packets contain drawing operations the results of which are not dependent on the current contents of the frame buffer at their Target region. That is, the contents of the target region are obliterated by the drawing operation. Operations whose results do depend on the current frame buffer contents (e.g., semi-transparent fills), cannot be represented as Obliterating packets. Obliterating packets may be restricted to very simple drawing operations, to reduce complexity in graphics processing, and in the Viewer component. Therefore, non-rectangular solid area fills may be represented as several smaller rectangular fills, which when combined produce the same net result. Conversely, Obliterating packets may also be more complex, increasing the required complexity of the graphics processing components. This potentially reduces bandwidth requirements, by eliminating the need for additional Dirty packets. If the more complex packets are utilized, they should follow the above-described rule that the resulting state of the Target region of an Obliterating packet should be independent the original contents of screen. An example of a complex Obliterating packet could be drawing text over a solid background, with a certain font and style. It should be noted that text drawn with no background fill cannot be represented in this way, as the precise Target region would be too complicated to calculate.

The graphics processing stage may send frequent requests for specific screen regions to the video capture driver 52. These requests come in the form of user-defined OS drawing calls. As a response to such a request, the video capture driver 52 outputs an Obliterating packet describing an image copy of the image data already present in the requested region, to that same requested region. These packets are indistinguishable from packets generated from a real image copy drawing operation, (e.g. copying an in-memory image onto the screen).

Copy packets define a rectangular screen region which is to be copied to another part of the screen. The target region is completely replaced with the copied data. The source region remains unchanged, apart from any part of the source region that overlaps with the target region. To reduce processing complexity, Copy packets can be restricted to rectangular regions, with more complex copy operations being broken down into these simpler operations. However, care should be taken to output these packets in the correct order if the source and target regions overlap, or video corruption may occur at the viewer.

Dirty packets are produced as a result of complicated drawing operations, which cannot simply be represented as a series of less complex operations. Examples of drawing operations that would produce such packets are complex path fills and semi-transparent image copies. A Dirty packet details a region of the screen that has been affected by a drawing operation. To reduce complexity, the region the packet describes may cover more of the screen than the actual region affected by the drawing operation (i.e., a superset of the affected region). This can be helpful if a precise region calculation is too costly in terms of processing time. However, the dirty region should never be a subset of the affected region, or screen corruption will occur on the viewer. For example, a circular affected region, of diameter 10 pixels, could be represented by a 10×10 square dirty region, completely covering the circle.

As described above, a dedicated thread in the Video capture component 54 reads captured packets from the circular packet buffer 56. When the video capture driver 52 is capturing data, packets can be generated at an extremely high rate. Each of these packets incurs a processing overhead as they move through each subsequent stage processing stage. Accordingly, the video capture component 54 can bunch similar packets together into small chunks of packets, which can be safely processed as a single unit. However, only Obliterating and Dirty packets may be bunched together. In addition, packets can only be bunched together with other packets of the same type. This bunching does not change the order of any packets. The chunks can then be placed onto a queue, ready for processing in the processing thread. Packet chunks are reference counted. When all references to a packet chunk have been released, the packet chunk is deleted automatically. It should be noted that the dedicated capture thread is an enhancement to increase robustness of the video capture system under high system load. According to another embodiment of the present disclosure, the dedicated capture thread and the processing queue 60 can be removed. In this case, the Processing thread can be utilized to retrieve the captured video data directly from the video capture driver 52.

Processing thread 28 performs multiple tasks including caching and color reduction processing. Processing thread 28 takes packet chunks from the processing queue 26 (Step S60), blocking if there are none available. If the packet chunk contains Obliterating, Copy or Dirty packets (No, Step S62), the packet is placed onto the Update queue 30 (Step S64). A determination is made whether the Packet chunk contains Dirty packets (Step S66). The Update queue 30 now holds a new reference to the packet, so that the packet chunk will persist, even if the Processing thread 28 releases it. If it is determined that the packet chunk contains Dirty packets (Yes, Step S66), since Dirty packets do not need to be sent to the Viewer machine, they are discarded by the processing thread 28, at this stage (Step S72). It should be noted that Marker packets are not placed onto the Update queue 30 at this stage. The remaining packets then undergo normal caching and color reduction steps (Step S68), before being added to the network queue 38 (Step S70).

Figure 7:
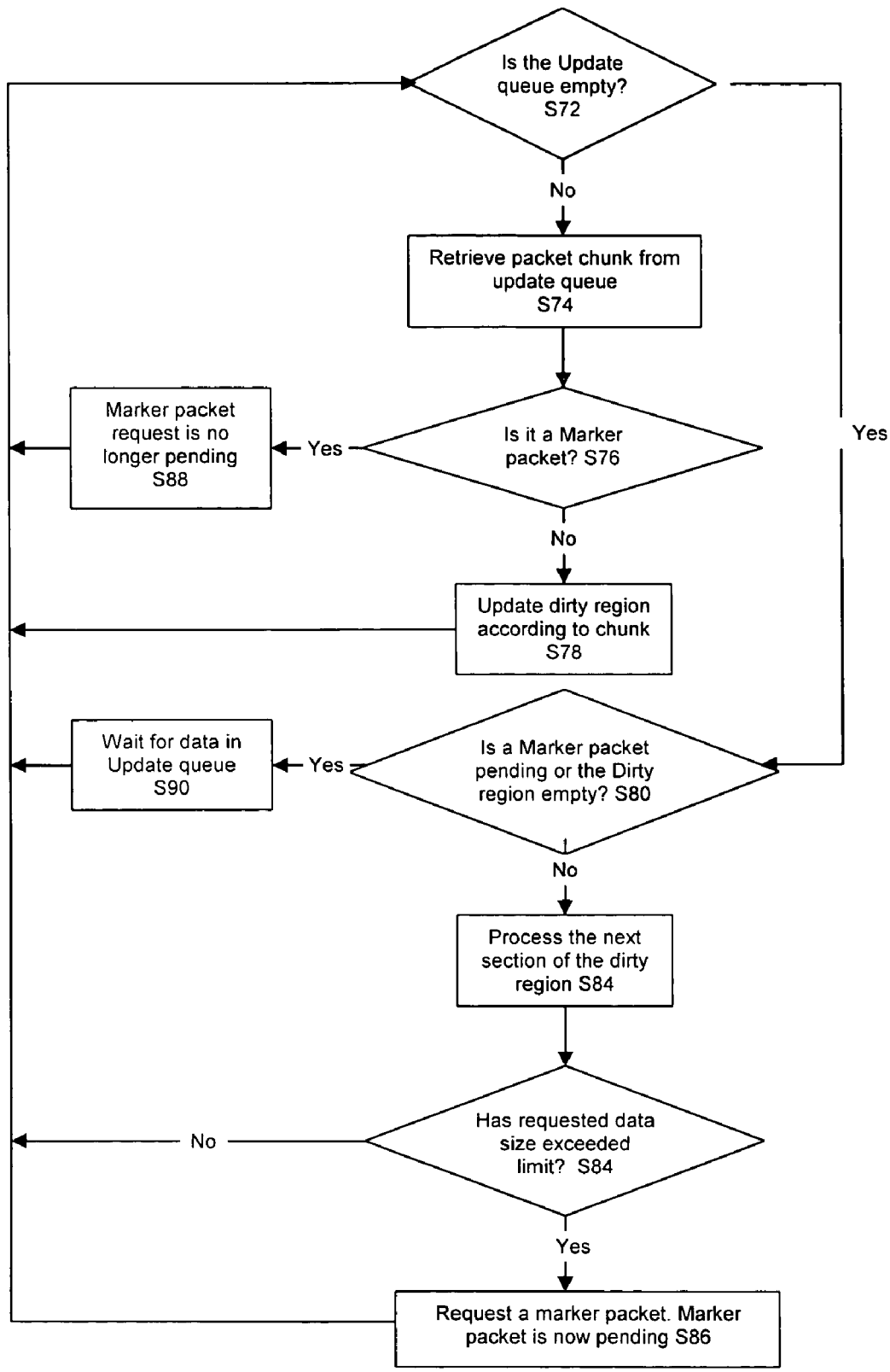
FIG. 7 is a flow chart for describing the update thread according to an embodiment of the present disclosure.

The Update thread 32 will now be described by reference to FIG. 7. The Update thread 32 runs in a loop until it exits when video capture is stopped. The Update thread 32 has primarily two distinct tasks: processing packets from the Update queue 30; and processing the Dirty region 34, to request screen updates from the Video Capture driver 24.

A determination is made whether the Update queue 30 is empty. If the update queue is not empty (No, Step S72), a packet chunk is retrieved from the Update queue 30 (Step S74). It Should be noted that if packets are available in the Update queue 30, the Update thread 32 processes these first, before performing any of its other duties. That is, the Update queue is considered a higher priority than the Dirty region processing. A determination is made whether the packet is a Marker packet (Step S76). The Update thread 32 uses Marker packets to prevent flooding the Viewer connection with data faster than it can be sent. When the Update thread 32 wants to synchronize with the Viewer connection, it requests a marker packet from the Video Capture driver 24. This packet is fed through the video capture pipeline until it reaches the point at which it would be sent to the Viewer. It is then finally delivered to the Update thread 32, through the Update queue 30, and is not sent to the Viewer. If the packet is a Marker packet, the Marker packet is discarded (Step S88). The Marker packet is no longer pending. If the packet is not a Marker packet (No, Step S76), the Dirty region 34 is updated according to the chunk (Step S78). When it is determined that Update queue 30 is empty (Yes, Step S72), it is determined whether a Marker packet is pending or the Dirty region is empty (Step S80). If a Marker packet is pending or the Dirty region is empty (Yes, Step S90), the thread waits for data in the update queue (Step S90) and the process returns. If a Marker packet is not pending or if the Dirty region is not empty (No, Step S80), the next section of the Dirty region 34 is processed (Step S82). A determination is then made whether the requested data size has exceeded its limit (Step S84). If it has not (No, Step S84), the process returns. If it has exceed its limit (Yes, Step S84), a Marker packet is requested (Step S86) so that the Marker packet is now pending. When there are no packet chunks waiting to be processed in the Update queue, and the Dirty region is empty, or a Marker packet request is pending the Update thread is idle.

Figure 8:
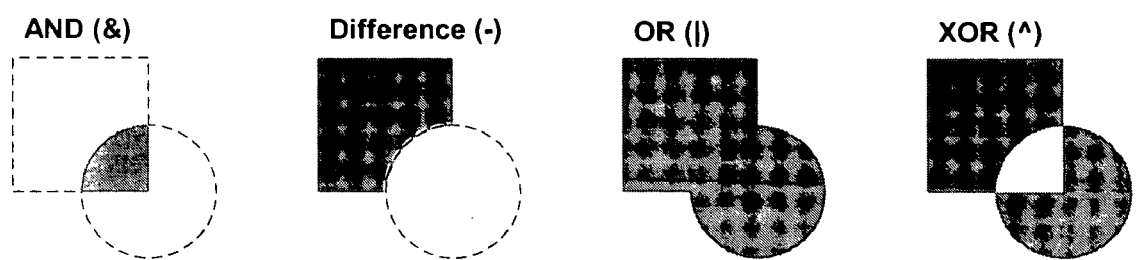
FIG. 8 depicts ways of processing packets of data according to an embodiment of the present disclosure.

The processing of packet chunks will now be described by reference to FIG. 8. The following descriptions are represented partially in pseudo code, where code indentation indicates functional blocks. The processing relies on multiple region operations. A region is a rectangle, polygon, or ellipse (or a combination of two or more of these shapes). Applications can combine regions together, and compare them. Regions can be combined using four operations including AND, Difference, OR and exclusive OR operations as shown in FIG. 8. Regions can also be copied and offset by a vector. In the following pseudo-code, DirtyRegion is the Dirty region 34 maintained by the Update thread 32, TargetRegion is the Target region affected by the current packet chunk, SourceRegion is the source region of a Copy packet (e.g., the area of the screen that will be copied to the TargetRegion) and TempRegion is a temporary region, used for intermediate calculations. TargetOrigin and SourceOrigin are the origins (top-left corners) of the Source & Target regions Each packet chunk is processed as follows:

```
IF Packet is Obliterating
    DirtyRegion = DirtyRegion – TargetRegion
ELSE IF Packet is Dirty
    DirtyRegion = DirtyRegion | TargetRegion
ELSE IF Packet is Screen to Screen Copy
    TempRegion = SourceRegion & DirtyRegion;
    Offset TempRegion by vector (TargetOrigin – SourceOrigin);
    DirtyRegion –= TargetRegion;
    DirtyRegion |= TempRegion;
```

Processing of the Dirty region starts from the last position in the Dirty region, working from top to bottom, breaking a section of the Dirty Region into Rectangles. This section is then excluded (subtracted) from the Dirty region. Each rectangle is requested from the Video capture driver 24, using a user-defined drawing call. If the Dirty region processing reaches the bottom of the Dirty region 34, or if the total area requested from the Video capture driver since the last Marker packet was received exceeds a configured limit, a Marker packet will be requested. Processing the Dirty region 34 to generate rectangle requests can be approached in several ways. The algorithm used to break down the Dirty region 34 does not need to be exact, as long as the union of the rectangles requested completely covers the Dirty region. That is, the requested region may be a superset of the dirty region, but not a subset.

According to another embodiment of the present disclosure, the task of processing the Update queue 30 can be moved into the Processing thread 28, thereby avoiding the need for the Update queue 30. In this embodiment, the Processing thread 28 updates the Dirty region 34 according to each packet chunk. The Update thread 32 would then only be responsible for processing the Dirty region to request screen updates. One possible limitation of this approach is that it would require all thread access of the Dirty region 34 to be serialized, which may hinder performance as region operations are relatively CPU intensive. Therefore, according to another embodiment of the present disclosure, better performance can be achieved by combining the Processing thread 28 and the Update thread 32 completely, as will be described below.

Figure 9:
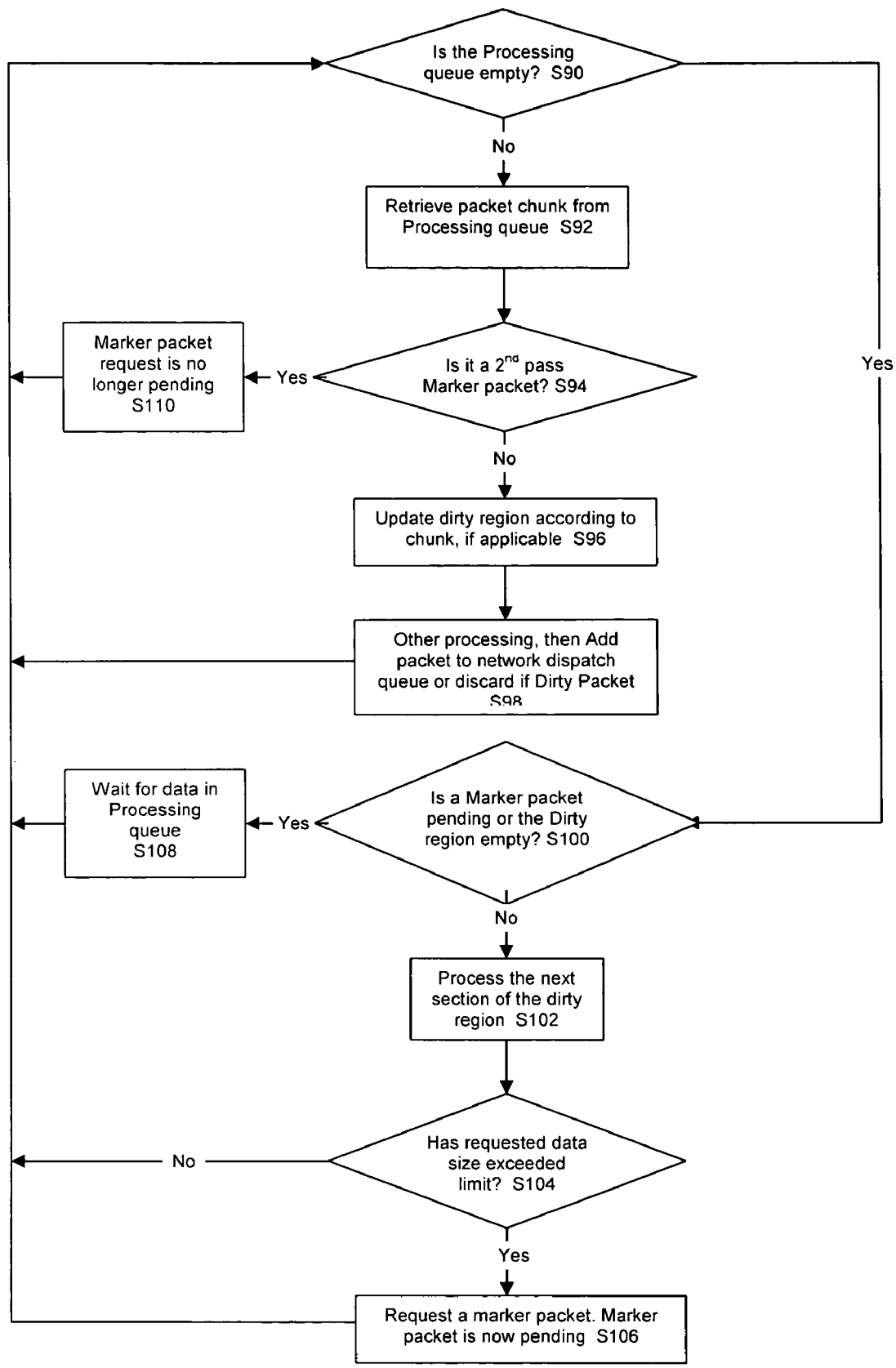
FIG. 9 is a flow diagram for describing update and processing threads combined, according to an embodiment of the present disclosure.

According to this embodiment of the present disclosure, the tasks of the Update thread 32 and the Processing thread 28 are combined into a single thread, as shown by the flow diagram depicted in FIG. 9. This removes the need for the Update queue 30. The main difference with this embodiment is that the Network dispatch thread 36 is now given the task of inserting Marker packets back into the Processing thread 28 when they arrive at the head of the Network queue 38. The Processing thread 28 should then ignore the Marker packet on its first pass through the processing thread, for example by means of a pass counter in the packet. FIG. 9 is a flow chart for describing this embodiment of the present disclosure.

A determination is made whether the Processing queue 26 is empty (Step S90). If it is not empty (No, Step S90), a packet chunk is retrieved from the processing queue 26 (Step S92). A determination is then made whether the packet chunk is a second pass of a Marker packet (Step S94). If it is the second pass (Yes, Step S94), the Marker packet is discarded and the Marker packet is no longer pending (Step S110). If it is not the second pass (No, Step S94), the Dirty region 34 is updated according to the chunk (if applicable) (Step S96). Other processing can then be performed, adding the packet to the Network queue 38 or discarding the packet if it is a Dirty packet (Step S98). If the Processing queue is empty (Yes, Step S90), a determination is made whether a Marker packet is pending or the Dirty region is empty (Step S100). If a Marker packet is pending or the Dirty region is empty (Yes, Step S100), the process waits for data in the processing queue (Step S108). If a Marker packet is not pending or the Dirty region is not empty (No, Step S100), the next section of the Dirty region is processed (Step S102). If the requested data size has exceeded its limit (Yes, Step S104), a Market packet is requested so that the Marker packet is now pending (Step S106). If the requested data size has not exceeded its limit (No, Step S104), the process returns.

Other types of packets can be used. For example, a new packet type, known Update packets can be added. These packets are an extension to Dirty packets, and contain a superset of the information a Dirty packet contains. In addition, they may also contain complex drawing instructions, which can optionally be sent to the Viewer machine, thus avoiding Dirty region processing, and potentially reducing the required network bandwidth. Drawing operations represented by Update packets can have results that do depend on the existing contents of their Target region. That is, the target region does not have to be completely obliterated by the drawing command. As with Dirty packets, the Target region for each Update packet can be a superset of the actual affected region. For example, complex drawing operations that can not be represented by Obliterating packets (e.g., text drawing with a transparent background), can often be represented as Update packets. Update packets are optional, and are employed to reduce the bandwidth requirements, when connected to a fully-featured viewer machine, capable of rendering more complex drawing operations. These Update packets are supported in the combined Processing and Update thread system, explained above. During graphics processing, these Update packets undergo Dirty region processing. If the intersection of the packet's Target region and the current Dirty region is an empty region, then the packet can be sent to the Viewer machine. Otherwise it is processed as a Dirty packet, and the extra drawing information is discarded. In addition, if a viewer is unable to render an Update packet, as established during connection negotiations or if the network connection is too heavily loaded, these Update packets can also be processed immediately as Dirty packets, regardless of the state of the Dirty region.

Multiple Viewer connections can be supported by adding additional network dispatch queues and threads for each viewer. The only additional consideration is that Marker packets should only be added to the Update queue, or returned to the Processing queue for the second pass (if applicable) once all of the Network dispatch threads have processed the pending marker packet. This can be achieved with reference counting.

The embodiments of the present disclosure allow easier porting to new platforms. The embodiments of the present disclosure also allow thin-client Viewer components to be easily developed for web-browsers (Java) and low-performance computing devices, such as Smart-phones and PDAs.

Figure 10:
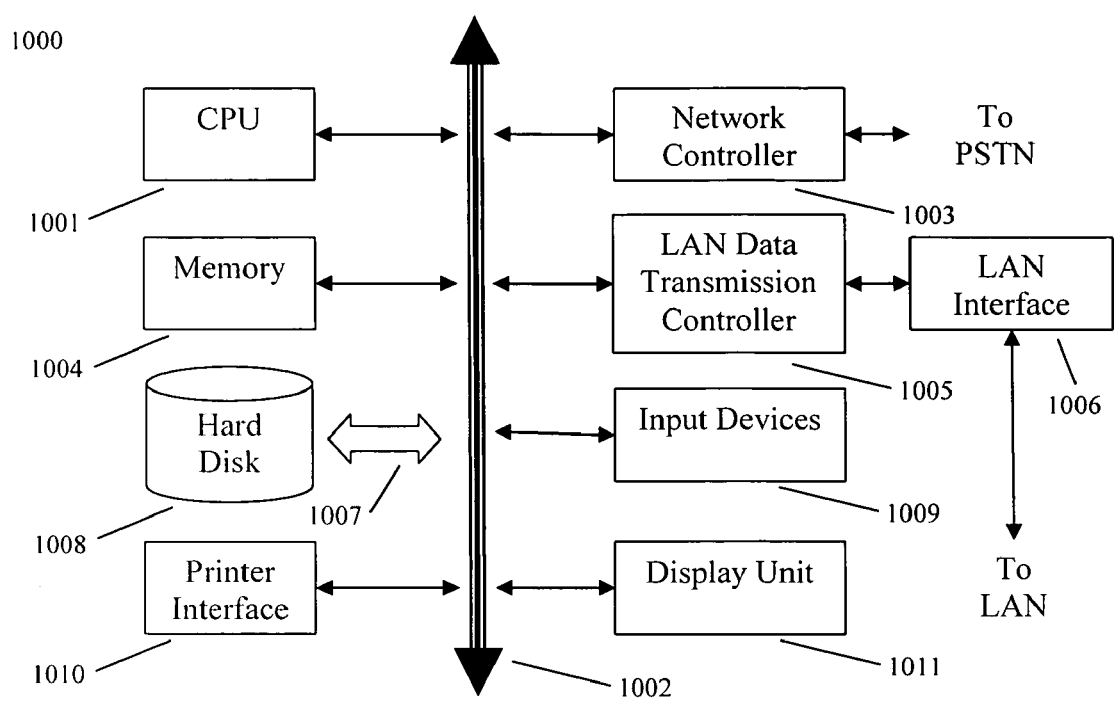
FIG. 10 is a block diagram of a system capable of implementing embodiments of the present disclosure.

FIG. 10 shows an example of a computer system which may implement the methods and systems of the present disclosure. The systems and methods of the present disclosure may be implemented in the foml of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The present disclosure may be conveniently implemented using one or more conventional general purpose digital computers and/or servers programmed according to the teachings of the present specification. Appropriate software coding can readily be prepared by skilled programmers based on the teachings of the present disclosure. The present disclosure may also be implemented by the preparation of application specific integrated circuits or by interconnecting an appropriate network of conventional component circuits.

Numerous additional modifications and variations of the present disclosure are possible in view of the above-teachings. It is therefore to be understood that within the scope of the appended claims, the present disclosure may be practiced other than as specifically described herein.

What is claimed is:

1. A method of capturing a screen, comprising:
    monitoring, by a computer system, screen changes on a first display system of the computer system, and inserting information regarding the screen changes into a queue, the information including one or more dirty packets describing screen changes in which one or more areas of the screen have been modified and one or more obliterating packets describing screen changes that are simple drawing operations, the simple drawing operations being universal with respect to at least two different operating systems;
    reading, by the computer system, the information from the queue; and
    maintaining, by the computer system, a dirty region describing areas of the screen which have been changed, the dirty region being distinct from the queue, wherein areas of the screen affected by the one or more dirty packets are added to the dirty region and areas of the screen affected by the one or more obliterating packets are subtracted from the dirty region.

2. The method of claim 1, wherein the information inserted into the queue comprises serialized information.

3. The method of claim 2, wherein the serialized information comprises serialized data packets.

4. The method of claim 1, wherein the information further comprises copy packets describing screen to screen copy operations.

5. The method of claim 4, further comprising:
    scanning through the dirty region and breaking the dirty region down into a plurality of smaller areas;
    for each of the smaller areas, requesting a bitmap packet for a corresponding area of the screen and placing the bitmap packet into the queue;
    requesting a marker packet be placed into the queue when a predetermined event occurs; and
    stopping scanning of the dirty region when the predetermined event occurs.

6. The method of claim 5, wherein the predetermined event comprises at least one of completion of scanning though the dirty region and a predetermined amount of information having been requested.

7. The method of claim 6, further comprising retrieving packets out of the queue and transmitting the read packets to a second display system until a marker packet is retrieved.

8. The method of claim 7, wherein when the marker packet is retrieved the marker packet is discarded and scanning of the dirty region is restarted.

9. A system for capturing a screen, comprising:
    a monitoring unit for monitoring screen changes on a first display system and inserting information regarding the screen changes into a queue, the information including one or more dirty packets describing screen changes in which one or more areas of the screen have been modified and one or more obliterating packets describing screen changes that are simple drawing operations, the simple drawing operations being universal with respect to at least two different operating systems;
    a reading unit for reading the information from the queue; and
    a maintaining unit for maintaining a dirty region describing areas of the screen which have been changed, the dirty region being distinct from the queue, wherein areas of the screen affected by the one or more dirty packets are added to the dirty region and areas of the screen affected by the one or more obliterating packets are subtracted from the dirty region.

10. The system of claim 9, wherein the information inserted into the queue comprises serialized information.

11. The system of claim 10, wherein the serialized information comprises serialized data packets.

12. The system of claim 9, wherein the information further comprises copy packets describing screen to screen copy operations.

13. The system of claim 12, further comprising:
    a scanning unit for scanning through the dirty region and breaking the dirty region down into a plurality of smaller areas;
    a unit that for each of the smaller areas, requesting a bitmap packet for a corresponding area of the screen and placing the bitmap packet into the queue;
    a requesting unit for requesting a marker packet be placed into the queue when a predetermined event occurs; and
    a stopping unit for stopping scanning of the dirty region when the predetermined event occurs.

14. The system of claim 13, wherein the predetermined event comprises at least one of completion of scanning though the dirty region and a predetermined amount of information having been requested.

15. The system of claim 14, further comprising a retrieving unit for retrieving packets out of the queue and transmitting the read packets to a second display system until a marker packet is retrieved.

16. The system of claim 15, wherein when the marker packet is retrieved the marker packet is discarded and scanning of the dirty region is restarted.

17. A computer recording medium including computer executable code for capturing a screen, the computer executable code operable when executed by one or more processing units to perform operations comprising:
    monitoring screen changes on a first display system of the computer system, and inserting information regarding the screen changes into a queue, the information including one or more dirty packets describing screen changes in which one or more areas of the screen have been modified and one or more obliterating packets describing screen changes that are simple drawing operations, the simple drawing operations being universal with respect to at least two different operating systems;

reading the information from the queue; and maintaining a dirty region describing areas of the screen which have been changed, the dirty region being distinct from the queue, wherein areas affected by the one or more dirty packets are added to the dirty region and areas of the screen affected by the one or more obliterating packets are subtracted from the dirty region.

18. The computer recording medium of claim 17, wherein the information inserted into the queue comprises serialized information.

19. The computer recording medium of claim 18, wherein the serialized information comprises serialized data packets.

20. The computer recording medium of claim 17, wherein the information further comprises copy packets describing screen to screen copy operations.

21. The computer recording medium of claim 20, further comprising:

code for scanning through the dirty region and breaking the dirty region down into a plurality of smaller areas;

code for each of the smaller areas, for requesting a bitmap packet for a corresponding area of the screen and placing the bitmap packet into the queue;

code for requesting a marker packet be placed into the queue when a predetermined event occurs; and code for stopping scanning of the dirty region when the predetermined event occurs.

22. The computer recording medium of claim 21, wherein the predetermined event comprises at least one of completion of scanning though the dirty region and a predetermined amount of information having been requested.

23. The computer recording medium of claim 22, further comprising code for retrieving packets out of the queue and code for transmitting the read packets to a second display system until a marker packet is retrieved.

24. The computer recording medium of claim 23, wherein when the marker packet is retrieved the marker packet is discarded and scanning of the dirty region is restarted.

* * * * *